United States Patent
Iustin

(10) Patent No.: US 12,505,708 B2
(45) Date of Patent: Dec. 23, 2025

(54) COMPUTER-IMPLEMENTED METHOD AND A SYSTEM FOR PROVIDING RECOMMENDATION DATA ASSOCIATED TO A VEHICLE

(71) Applicant: VOLVO TRUCK CORPORATION, Gothenburg (SE)

(72) Inventor: Roman Iustin, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 275 days.

(21) Appl. No.: 18/321,431

(22) Filed: May 22, 2023

(65) Prior Publication Data

US 2023/0386271 A1 Nov. 30, 2023

(30) Foreign Application Priority Data

May 24, 2022 (EP) .................................... 22174989

(51) Int. Cl.
| | |
|---|---|
| *G07C 5/08* | (2006.01) |
| *B60S 5/00* | (2006.01) |
| *B62D 65/02* | (2006.01) |
| *G06Q 10/20* | (2023.01) |
| *G07C 5/00* | (2006.01) |
| *H04W 4/44* | (2018.01) |

(52) U.S. Cl.
CPC .............. *G07C 5/0816* (2013.01); *B60S 5/00* (2013.01); *G07C 5/008* (2013.01); *B62D 65/022* (2013.01); *H04W 4/44* (2018.02)

(58) Field of Classification Search
CPC ......... G07C 5/0816; G07C 5/008; B60S 5/00; B62D 65/022; H04W 4/44; G06Q 10/20; G05B 19/4183

USPC ........................................................ 701/29.6
See application file for complete search history.

(56) References Cited

U.S. PATENT DOCUMENTS

| | | | |
|---|---|---|---|
| 5,935,180 | A | 8/1999 | Fieramosca et al. |
| 6,856,844 | B1 | 2/2005 | McKenzie |

(Continued)

FOREIGN PATENT DOCUMENTS

| | | |
|---|---|---|
| EP | 2486549 A1 | 8/2012 |
| GB | 2352838 A | 2/2001 |
| WO | 2011043715 A1 | 4/2011 |

OTHER PUBLICATIONS

Extended European Search Report in corresponding European Application No. 22174989.8 dated Oct. 13, 2022 (10 pages).

*Primary Examiner* — Tyler D Paige
(74) *Attorney, Agent, or Firm* — Jeffri A. Kaminski; Venable LLP

(57) ABSTRACT

A system and to a computer-implemented method of providing recommendation data associated to a vehicle before, when or after it arrives at a predetermined location, the predetermined location being on an assembly line or in a workshop, is provided. A wireless request signal is sent from an off-board transceiver towards. A wireless response signal is trigger by the wireless request signal and is transmitted from an on-board transceiver of the vehicle and received by the off-board receiver. The wireless response signal contains an identification of the vehicle chassis number of the vehicle. A control unit accesses a database and identifies recommendation data associated with the identified vehicle chassis number in said database. The control unit presents the identified recommendation data via a user interface.

17 Claims, 3 Drawing Sheets

(56) References Cited

U.S. PATENT DOCUMENTS

| | | | |
|---|---|---|---|
| 12,071,189 B2* | 8/2024 | Thomas | G01M 17/04 |
| 2010/0030353 A1 | 2/2010 | Koishi et al. | |
| 2015/0061898 A1 | 3/2015 | Muriana | |
| 2018/0365912 A1 | 12/2018 | Nyalamadugu et al. | |
| 2019/0121350 A1* | 4/2019 | Cella | G05B 19/41875 |
| 2021/0407226 A1* | 12/2021 | Zhang | G06Q 10/20 |
| 2023/0386271 A1* | 11/2023 | Iustin | B60S 5/00 |
| 2024/0290145 A1* | 8/2024 | Iustin | B60C 23/0472 |
| 2024/0400075 A1* | 12/2024 | Neely | B60W 50/12 |

\* cited by examiner

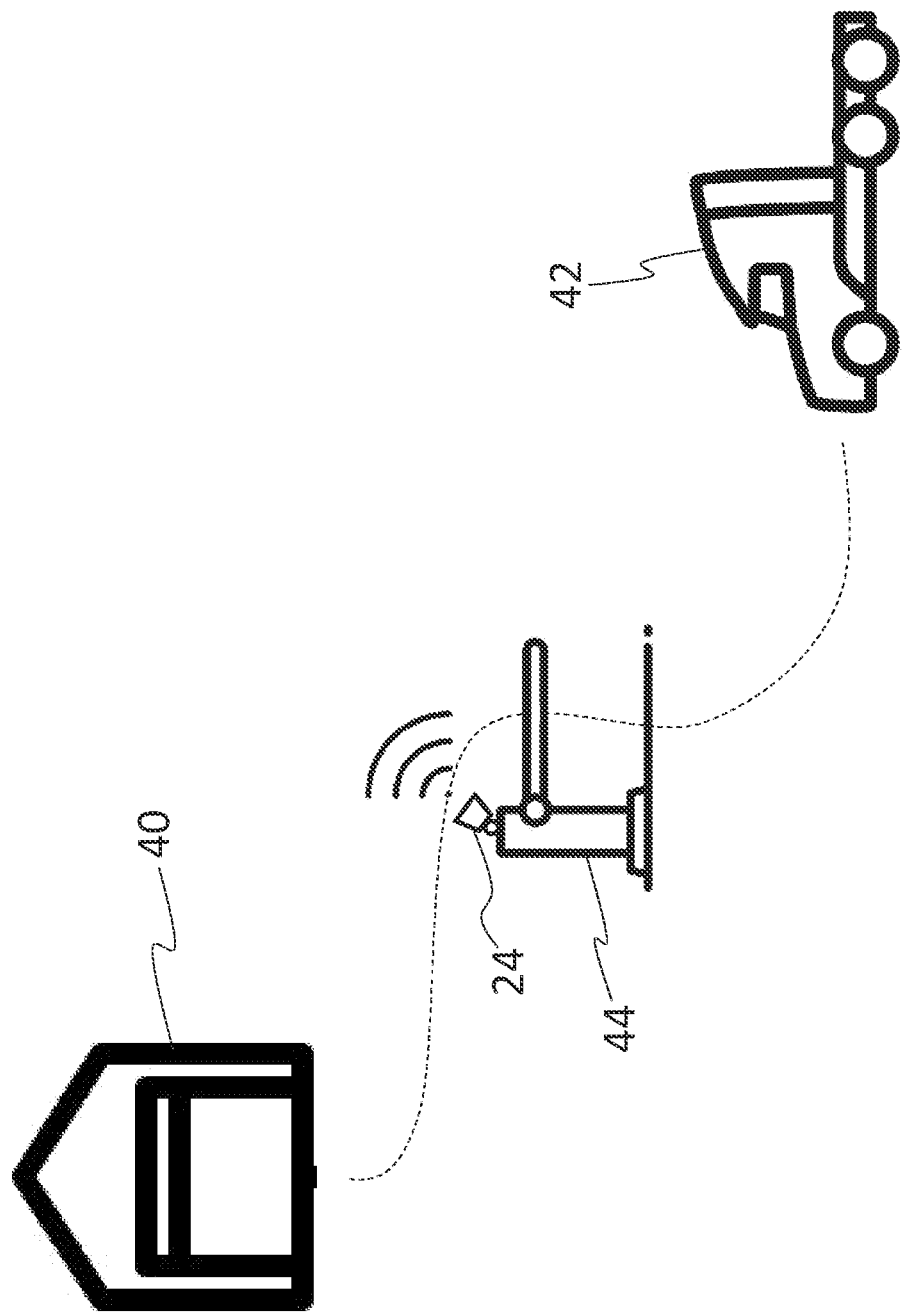

COMPUTER-IMPLEMENTED METHOD AND A SYSTEM FOR PROVIDING RECOMMENDATION DATA ASSOCIATED TO A VEHICLE

TECHNICAL FIELD

The present disclosure relates to a computer-implemented method of providing recommendation data associated to a vehicle. The present disclosure also relates to a computer program, a computer readable medium and a control unit for controlling the provision of recommendation data. The present disclosure further relates to a system configured to provide recommendation data associated to a vehicle.

The teachings of the present disclosure can be applied in relation to heavy-duty vehicles, such as trucks, buses and construction equipment. Although the present disclosure will be described mainly with respect to a heavy-duty vehicle, it should be understood that the general idea of the present disclosure is not restricted to this particular vehicle, but may also be used in relation to other vehicles such as cars.

BACKGROUND

It is generally desirable to reduce or avoid time-consuming procedures when working on vehicles. This may be the case at a production facility, such as when vehicles are being assembled on an assembly line, and it may also be the case at service providers, such as workshops when vehicles need to be repaired, updated, or looked over for general maintenance, etc.

Under various circumstances it may be necessary to take into account the identity of an individual vehicle, and not just rely on a type of vehicle or a general brand or model. For instance, for one and the same vehicle model certain customers may desire to have the vehicle equipped with one type of tires, while other customers may desire to have a different type of tires mounted, and so on. Therefore, when vehicles are transported one after another along an assembly line, it may in relation to certain locations (such as tire mounting stations) be necessary for the workers to determine the individual identity of the vehicle so that the vehicle can be provided with the proper vehicle part (e.g. a specific type of tire, or an axle or any other vehicle part that has been planned to be applied to the specific vehicle). To do this, a worker may use a diagnostic tool and connect it into an on-board diagnostic connector of the vehicle to get a reading of the vehicle chassis number. The reading obtained with the diagnostic tool is then transferred to a reading station, where the worker can identify the vehicle chassis number and determine which vehicle part (e.g. which type of tire) this particular vehicle should be equipped with. These procedures are time consuming. An alternative to connecting a diagnostic tool is for a worker to approach the vehicle and use a scanner to read a label provided on the vehicle chassis, thereby obtaining the vehicle chassis number. This too is part of a time consuming procedure.

Similar time consuming procedures exist in workshops, where the workshop personnel oftentimes connects a diagnostic tool to the on-board diagnostic connector, to get a reading and then transfers the data to a reading station, in order to then determine which actions should be taken for that particular vehicle.

In view of the above, it should be clear that there is room for improvement when it comes to time-saving measures.

SUMMARY

An object of the present disclosure is to provide a computer-implemented method and a system which at least partly alleviates the drawbacks of the prior art. This and other objections, which will become apparent in the following discussion, are achieved by a computer-implemented method and by a system according to the accompanying independent claims. Some non-limiting exemplary embodiments are presented in the dependent claims.

The inventor has realized that much of the above-mentioned time-consuming manual procedure for identifying a specific vehicle part or action to be taken for a vehicle, may be replaced by an efficient and automated procedure. In particular, the inventor has realized that instead of a worker spending time on connecting a diagnostic tool into an on-board diagnostic connector and then transferring the reading to a reading station, a wireless and automated procedure may be implemented. By letting an off-board transceiver acquire the vehicle chassis number wirelessly from an on-board transceiver, and automatically identifying from a database a recommendation associated with said vehicle chassis number, a worker may in a very time-efficient way get the desired vehicle-specific recommendation. The general inventive concept and some non-limiting exemplary embodiments will now be discussed.

According to a first aspect of the present disclosure, there is provided a computer-implemented method of providing recommendation data associated to a vehicle before, when or after it arrives at a predetermined location, said predetermined location being on an assembly line or in a workshop, the method comprising:

sending a wireless request signal from an off-board transceiver towards the vehicle, receiving, by the off-board transceiver, a wireless response signal from an on-board transceiver of the vehicle, the wireless response signal being triggered by the wireless request signal and containing an identification of the vehicle chassis number of the vehicle, accessing, by means of a control unit, a database in which different vehicle chassis numbers are associated with respective recommendation data, identifying, by means of the control unit, recommendation data associated with the identified vehicle chassis number in said database, and presenting, by means of the control unit, the identified recommendation data via a user interface.

By using wireless communication between an off-board transceiver and an on-board transceiver, a control unit may efficiently acquire the relevant vehicle chassis number and access a database in which recommendation data and vehicle chassis numbers are associated to each other, and then present the relevant associated recommendation data to a user, without the user needing to previously access and manually connect a diagnostic tool to the vehicle.

As indicated above, the recommendation data may be presented before, when, or after the vehicle arrives at the predetermined location. From this, it may be inferred, that although the removal of the manual connecting procedure is in itself a great time-saver, further time savings may be accomplished if the method is performed before the vehicle arrives at the predetermined location. For example, part of, or all of the steps in the method may be performed while the vehicle is approaching the predetermined location. For instance, as will be discussed in more detail below, a worker at a tire mounting station may have access to the recommendation, for example which types of tires to be mounted to a specific vehicle, even before that vehicle has reached tire mounting station. This may allow the worker to fetch the recommended tires and have them prepared by the time the specific vehicle reaches the tire mounting station. Nevertheless, it should be emphasized that time-saving benefits are also obtained even if the method is performed when the vehicle is already in place at the predetermined location.

It should be understood that the recommendation data may contain information of one or more vehicle parts (such as the above-exemplified tires), components, subsystems, etc. that is/are recommended to be mounted to an identified vehicle. Some other examples of vehicle parts in the recommendation data may be windshield, windshield wipers, headlights, parts associated with brakes (brake pads, discs, etc.), oil filter(s), type of oil, etc. These examples are parts related to typical repair or service of the vehicle, and may therefore be relevant when the teachings of the present disclosure is implemented in a workshop, but may of course also be relevant along an assembly line. As explained above, recommendation data may contain information of one or more vehicle parts, components, subsystems, etc. However, recommendation data may alternatively, or additionally, comprises recommendations for actions to be taken, which may advantageously be of use in workshops, as will be discussed later in more detail.

As has been repeatedly explained, the method of the present disclosure may be implemented in a workshop and/or on an assembly line (such as an assembly line in a vehicle manufacturing facility). In a workshop, the vehicle will normally arrive at the predetermined location as a completely assembled vehicle. However, on an assembly line, the vehicle will be assembled as it is transported along the assembly line. To avoid any doubt, it is emphasized that the term "vehicle" in this disclosure, is not limited to a completely assembled vehicle. Indeed, as should be clear from the above discussion, a "vehicle" is herein also to be understood to include an incomplete vehicle which is in the process of becoming assembled.

The computer-implemented method may be performed by said control unit. As such, the control unit may suitably comprise the off-board transceiver, or be operatively connected to the off-board transceiver, in order to control the sending of the wireless request signal and the processing of the received response signal.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

The database may comprise a set of vehicle chassis numbers that have been stored, each vehicle chassis number identifying a respective vehicle that is expected to arrive at the predetermined location. The database may also comprise recommendation data that has been stored and logically associated to each vehicle chassis number. As will be understood the same recommendation data content may be associated with several vehicle chassis numbers. Taking the example of the tires, the database mas have stored records where some vehicle chassis numbers are associated with a first type of tire, other vehicle chassis numbers are associated with a second type of tire, and further vehicle chassis numbers are associated with a third type of tire, etc. In case of a workshop implementation, the database may of course, if desired, have other vehicle chassis numbers as well, for example based on client associations. The database may be a local database provided at or forming part of the control unit, or it may be remotely located database, such as provided in are remote server accessible by the control unit.

In the following some exemplary embodiments will be listed, some of which have already been touched upon above.

According to at least one exemplary embodiment, said identified recommendation data comprises at least one vehicle part which is recommended for mounting on the vehicle. To have a recommended vehicle part associated with vehicle chassis number is particularly advantageous in a vehicle manufacturing facility in which a multitude of vehicles are assembled along an assembly line and at least some vehicles may have individual specifications as to which vehicle part should be mounted to the respective vehicle. By accessing such recommendation in a timely manner the correct vehicle part may be mounted without unnecessary delay. Nevertheless, such recommendation data may also be relevant and used in workshops, for instance, in connection with upgrades or replacement of parts.

According to at least one exemplary embodiment, said database comprises records of different types of said vehicle part, wherein said identified recommendation data associated with the identified vehicle chassis number comprises one of said different types of said vehicle part. As explained before in connection with the example of different types of tires desired by different clients, the recommendation data may thus suitably be a detailed individual-specific recommendation of for example a certain tire type (such as, model, dimensions, rim configuration, etc.) This is at least partly reflected in the following exemplary embodiment.

According to at least one exemplary embodiment, said predetermined location is a tire mounting station along an assembly line, wherein said identified recommendation data comprises the identification of a type of tire to be mounted when the vehicle has arrived at the tire mounting station. As mentioned previously, the recommendation may suitably (but not necessarily) be provide already before the vehicle has arrived at the tire mounting station. Anyhow, a worker can obtain the tire recommendation in a much more timely manner than in the prior art, where the vehicle needs to be approached for the manual connecting steps when probing for the vehicle chassis number.

From the above exemplary embodiments, it should now be understood that the recommendation which is presented may suitably be based on said predetermined location. Since it is conceivable to perform the method at different predetermined locations, it should be understood that different recommendation data may be provided depending on in connection with which predetermined location the method is performed. An area in a workshop and an area at an assembly line in a factory are clearly different predetermined locations. However, also within the same facility, there may be several different predetermined locations, for example along an assembly line, wherein different recommendation data may be presented in connection with the different predetermined locations. Accordingly, in a general sense, according to at least one exemplary embodiment, the content of said recommendation data is based on said predetermined location.

According to at least one exemplary embodiment, said predetermined location is in a workshop, wherein said identified recommendation data comprises a recommended action to be performed on the vehicle, such as a service, update, repair or installation action. In addition to the personnel at the workshop saving time by not needing to manual the connect a diagnostic tool physically to the vehicle to identify the vehicle chassis number, advantageously, the vehicle chassis number may suitably be acquired wirelessly before the vehicle has entered to the inside of the workshop, e.g. when arriving at the premises outside the workshop, whereby the personnel can be prepared and save additional time.

According to at least one exemplary embodiment, said on-board transceiver forms part of, or is operatively connected to, a tachograph, wherein said request signal and said response signal are transmitted by Dedicated Short Range Communication (DSRC). DSRC are known to be implemented as short-range to medium-range wireless communication channels which are specifically designed for automotive use. An advantage of this exemplary embodiment is that it allows the current location of the vehicle to be identified. This in turn may, for example, allow a determination to be made as to in which order different vehicles are arriving at the predetermined location. Such information may suitably be processed in the control unit and may, for instance, be used for prioritization decisions, such as in which order to fetch vehicle parts for different vehicles. More specifically, a DSRC antenna is normally a small patch array. Each patch may have phase steering, meaning that the beam of the antenna is dynamically changing. For instance, if the signal is coming from the left of the vehicle, the array elements are fed in order to send back the response in the same direction. By providing a DSRC reader at the assembly line and point it in the direction of the incoming vehicle, only that vehicle will send back the reply. This provides the "location" of that vehicle. In other words, because DSRC provides a beam pointing towards a specific vehicle and only that vehicle is responding back, DSRC can be regarded as acting like a beacon that is sending back information only when a triggered signal is encountered.

According to at least one exemplary embodiment, said on-board transceiver forms part of, or is operatively connected to, a wireless communication module, wherein the wireless communications module is configured for telematics communication, such as via 3G, 4G or 5G, and/or configured for wireless local area network communication, such as WiFi, wherein said request signal and said response signal are transmitted via telematics network and/or wireless local area network, respectively. This is advantageous as these means of communications are widely used in society, including workshops and factories, wherefore the exemplary embodiment may be smoothly implemented.

According to a second aspect of the present disclosure there is provided a computer program comprising program code means for performing the steps of the method according to the first aspect, including any embodiment thereof. The advantages of the computer program of the second aspect are largely analogous to the advantages of the method of the first aspect, including any embodiment thereof.

According to a third aspect of the present disclosure, there is provided a computer readable medium carrying a computer program comprising program code means for performing the steps of the method according to the first aspect, including any embodiment thereof, when said program product is run on a computer. The advantages of the computer readable medium of the third aspect are largely analogous to the advantages of the method of the first aspect, including any embodiment thereof.

According to a fourth aspect of the present disclosure, there is provided a control unit for controlling the provision of recommendation data associated to a vehicle before, when or after the vehicle arrives at a predetermined location, said predetermined location being on an assembly line or in a workshop, the control unit being configured to perform the steps of the method according to the first aspect, including any embodiment thereof. The advantages of the control unit of the fourth aspect are largely analogous to the advantages of the method of the first aspect, including any embodiment thereof.

According to a fifth aspect of the present disclosure there is provided a system configured to provide recommendation data associated to a vehicle before, when or after it arrives at a predetermined location, said predetermined location being on an assembly line or in a workshop, the system comprises:

an off-board transceiver configured to send a wireless request signal towards the vehicle and to receive a wireless response signal from an on-board transceiver of the vehicle, the wireless response signal being triggered by the wireless request signal and containing an identification about the vehicle chassis number of the vehicle, a database in which different vehicle chassis numbers are associated with respective recommendation data, a control unit, which comprises said off-board transceiver or which is operatively connected to said off-board transceiver, wherein the control unit is configured to access the database and, based on the wireless response signal, identify in the database recommendation data associated with the identified vehicle chassis number of the vehicle, and a user interface operatively connected to, or comprised in, the control unit, wherein the control unit is configured to present the identified recommendation data via the user interface.

The advantages of the system of the of the fifth aspect are largely analogous to the advantages of the method of the first aspect, including any embodiment thereof.

Some exemplary embodiments of the system of the fifth aspect will be listed below. The advantages of the listed exemplary embodiments have analogous advantages as the corresponding embodiments of the method of the first aspect.

According to at least one exemplary embodiment of the system, said identified recommendation data comprises at least one vehicle part which is recommended for mounting on the vehicle.

According to at least one exemplary embodiment of the system, said database comprises records of different types of said vehicle part, wherein said identified recommendation data associated with the identified vehicle chassis number comprises one of said different types of said vehicle part.

According to at least one exemplary embodiment of the system, said predetermined location is a tire mounting station along an assembly line, wherein said identified recommendation data comprises the identification of a type of tire to be mounted when the vehicle has arrived at the tire mounting station.

According to at least one exemplary embodiment of the system, said predetermined location is in a workshop, wherein said identified recommendation data comprises a recommended action to be performed on the vehicle, such as a service, update, repair or installation action.

According to at least one exemplary embodiment of the system, said on-board transceiver forms part of, or is operatively connected to, a tachograph, wherein said request signal and said response signal are transmitted by Dedicated Short Range Communication (DSRC).

According to at least one exemplary embodiment of the system, said on-board transceiver forms part of, or is operatively connected to, a wireless communication module, wherein the wireless communications module is configured for telematics communication, such as via 3G, 4G or 5G, and/or configured for wireless local area network communication, such as WiFi, wherein said request signal and said response signal are transmitted via telematics network and/or wireless local area network, respectively.

Generally, all terms used in the claims are to be interpreted according to their ordinary meaning in the technical field, unless explicitly defined otherwise herein. All references to "a/an/the part, element, apparatus, component, arrangement, device, means, step, etc." are to be interpreted openly as referring to at least one instance of the part, element, apparatus, component, arrangement, device, means, step, etc., unless explicitly stated otherwise. The steps of any method disclosed herein do not have to be performed in the exact order disclosed, unless explicitly stated. Further features of, and advantages with, the present inventive concept will become apparent when studying the appended claims and the following description. The skilled person realizes that different features of the present inventive concept may be combined to create embodiments other than those described in the following, without departing from the scope of the present inventive concept.

BRIEF DESCRIPTION OF THE DRAWINGS

With reference to the appended drawings, below follows a more detailed description of embodiments of the invention cited as examples.

In the drawings:

FIG. 2 is a schematic illustration of another possible implementation of a method and a system in accordance with at least some other exemplary embodiments of the present disclosure.

DETAILED DESCRIPTION OF EXAMPLE EMBODIMENTS OF THE INVENTION

Figure 1:
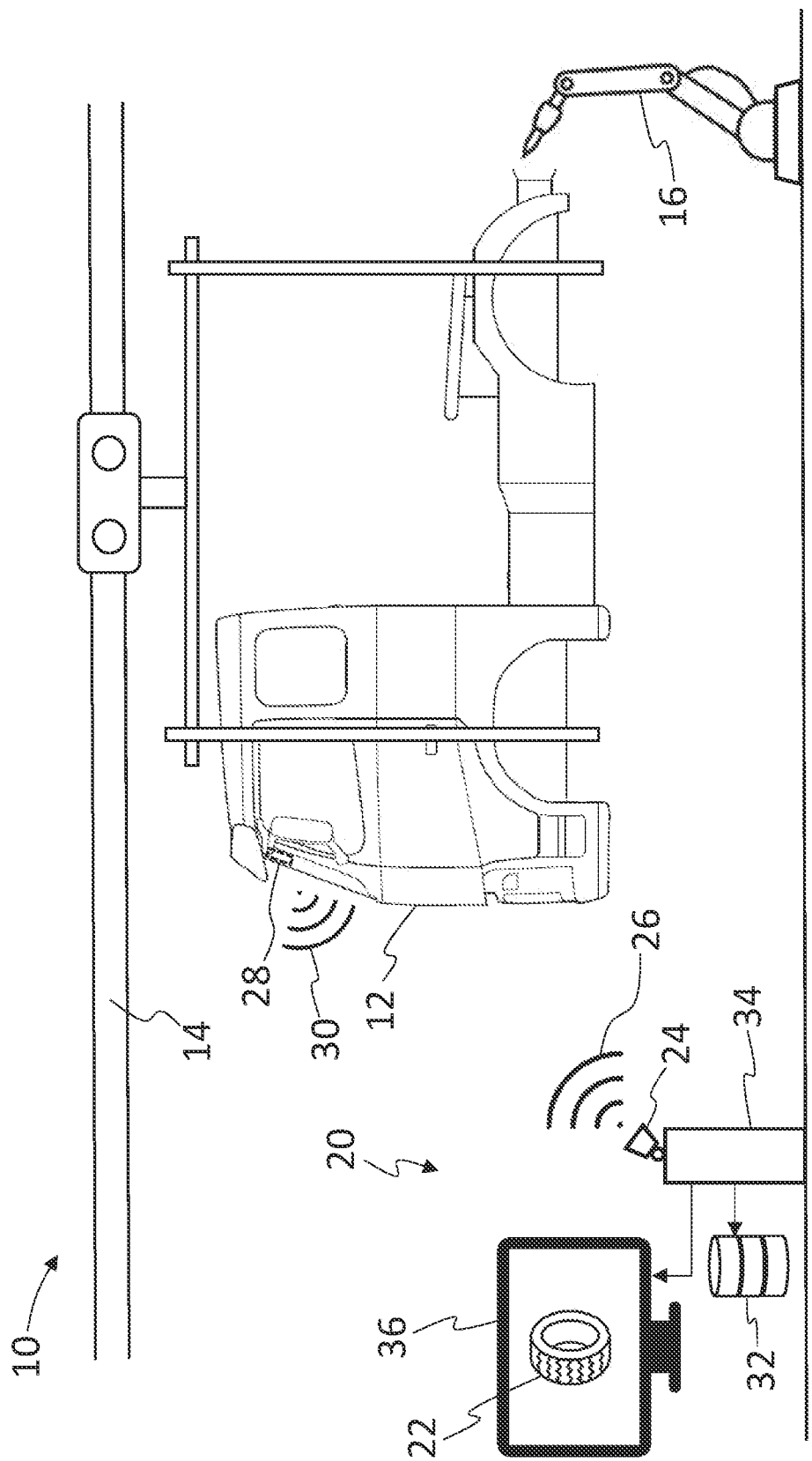
FIG. 1 is a schematic illustration of a possible implementation of a method and a system in accordance with at least some exemplary embodiments of the present disclosure.

The general inventive concept will now be described more fully hereinafter with reference to the accompanying drawings, in which certain aspects of the inventive concept are shown. The inventive concept may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the general inventive concept is not limited to the embodiments described herein and illustrated in the drawings; rather, the skilled person will recognize that many changes and modifications may be made within the scope of the appended claims. Like reference numerals refer to like elements throughout the description.

FIG. 1 is a schematic illustration of a possible implementation of a method and a system in accordance with at least some exemplary embodiments of the present disclosure. More specifically FIG. 1 illustrates that the teachings of the present disclosure may be implemented in connection with an assembly line 10, such as an assembly line 10 in a vehicle manufacturing facility. As illustrated in FIG. 1, a vehicle 12 which is being built is transported along a conveyor system 14 of the assembly line 10. Although the vehicle 12 is illustrated as being suspending from above, the teachings of this disclosure may, of course, be implemented for other types of assembly lines and conveyor systems, such as conveyor systems which support the vehicle 12 from below. As the vehicle 12 is transported along the assembly line 10 it becomes equipped with more and more vehicle parts. Some vehicle parts may be mounted manually, while some vehicle parts may be mounted automatically by for example robots 16.

Each vehicle that is being manufactured is given a unique vehicle chassis number (sometimes also referred to as "VIN", vehicle identification number, although in some factories the VIN and the chassis number may differ, in which case there is an IT system that connects them). One and the same vehicle model may be equipped with different vehicle parts. Just to give an illustrative example, a standard-equipped vehicle may be sold for a certain price, while a premium-equipped vehicle may be sold for a higher price. Also, there may be customer-specific demands for certain vehicle parts.

In the present illustrative example, it is assumed that the system and method of the present disclosure is implemented at a tire-mounting station, i.e. where tires are mounted to the vehicle 12. It should, however, be understood that the general idea of the present disclosure may readily be implemented for other vehicle parts mounted at other stations along the assembly line.

FIG. 1 illustrates a system 20 which is configured to provide recommendation data 22 associated to the vehicle 12. In this example, the recommendation data 22 may be a recommendation to mount specific type of tyre to the vehicle 12. For example, a customer has when ordering the vehicle selected a specific set of tires from different possible alternative sets of tires. The selection of tires has been appropriately associated with the vehicle chassis number. There may, for instance, be a direct association between the selection of tires and the vehicle chassis number, or an indirect association (e.g. both being associated to an order number). The process of how the selection of tires (i.e. the recommendation data 22) has actually been associated to the vehicle chassis number is subordinate; what is of relevance is the fact that the association has indeed been made.

As already explained in this disclosure, when a vehicle arrives at the tire station, a worker would normally have to manually connect a diagnostic tool to the vehicle to get a reading of the vehicle chassis number in order to determine which set of tires that should be mounted to that particular vehicle. The present system 20, however, makes such manual connection superfluous, as the system 20 provides for an automatic reading. A further advantage is that, if desired, the automatic reading and the presentation of the recommendation data 22 can be performed even before the vehicle 12 arrives at the tire mounting station. It should, however, by understood that the automatic reading can also be implemented when or after the vehicle 12 arrives at the tire mounting station. Thus, in a general sense, there is provided a system 20 configured to provide recommendation data 22 associated to a vehicle 12 before, when or after it arrives at a predetermined location, said predetermined location being on an assembly line 10 or in a workshop. As already understood from the previous discussion, in FIG. 1 the predetermined location may be a tire-mounting station and the recommendation data 22 may be a type of tire, but as will be discussed later in connection with FIG. 2, which illustrates a workshop implementation, there may be other conceivable recommendation data (which do not necessarily represent a recommendation of a certain vehicle part).

Continuing with FIG. 1, the system 20 comprises an off-board transceiver 24 configured to send a wireless request signal 26 towards the vehicle 12. The vehicle 12 is equipped with an on-board transceiver 28 (indicated by the dashed rectangle as being inside the vehicle 12). The wireless request signal 26 from the off-board transceiver 24 triggers the on-board transceiver 28 to transmit a wireless response signal 30. The wireless response signal 30 contains an identification about the vehicle chassis number of the vehicle 12. The off-board transceiver 24 is configured to receive the wireless response signal 30 transmitted from the on-board transceiver 28. In this way, by means of the off-board transceiver 24, the system can obtain the vehicle chassis number without requiring a manual connecting to the vehicle 12.

The system 20 also comprises a database 32 in which different vehicle chassis numbers are stored. Suitably, the database 32 contains the vehicle chassis numbers of at least those vehicles that are being assembled on the assembly line 10, but may suitably contain more vehicle chassis numbers, such as for vehicles which have been ordered but which will become assembled at a later occasion. In the database 32, vehicle chassis numbers are associated with respective recommendation data 22. In this example it may be different types or models of tires for the vehicle chassis numbers. Several vehicle chassis numbers may, of course, be associated with the same recommendation data content, i.e. the same type or model of tires may be recommended for a plurality of vehicles.

The system 20 further comprises a control unit 34. The control unit 34 may comprise the off-board transceiver 24 or may be operatively connected to the off-board transceiver 24. Indeed it should be understood that, although FIG. 1 illustrates all components of the system 20 as being located near each other, it does not necessarily need to be so. In particular, all the components do not need to be located at the assembly line 10. For instance, the control unit 34 and/or the database 32 may be located at a different location. The control unit 34 has access to the database 32, regardless of if it is a remotely located database, or a local database. The database 32 may even be included in the control unit 34.

Regardless of how the control unit 34 accesses the database 32, the control unit 34 is configured to, based on the wireless response signal 30 received by the off-board transceiver 24, identify in the database 32 recommendation data 22 associated with the identified vehicle chassis number of the vehicle 12. Thus, it should be understood that the control unit 34 may acquire the wireless response signal 30 received by the off-board transceiver 24 and process the information content of that wireless response signal 30.

The system 20 further comprises a user interface 36, which is here illustrated in the form of a digital screen. However, other types of digital displays or other types of user interfaces (e.g. audio interfaces) are also conceivable. The user interface 36 may be operatively connected to, or comprised in, the control unit 34. The control unit 34 is configured to present via the user interface 36 the recommendation data 22 that it has identified in the database 32. The user interface 36 does not necessarily need to be at the predetermined location, i.e. in this case at the tire mounting station. For instance, the user interface 36 may be located at a storage space where different vehicle parts, for example different tires are stored. A worker at the storage space may thus be notified of which set of tires to prepare for mounting at the tire mounting station. This may advantageously be done even before the vehicle 12 arrives at the tire mounting station.

It should again be emphasized that the system 20 may be used in relation to other location of the assembly line 10, and the recommendation data 22 may be for other vehicle parts. Similarly to the tire example, the database 32 may comprise records of different types of any such other vehicle part, wherein the recommendation data 22 associated with an identified vehicle chassis number will comprise one of said different types of said other vehicle part.

As has already been mentioned in this disclosure, the recommendation data may not necessarily be limited to the recommendation of a physical object such as a vehicle part. In some exemplary embodiments, the recommendation data may instead (or additionally) comprise a recommended action to be performed on the vehicle. This will now be discussed in connection with FIG. 2.

FIG. 2 is a schematic illustration of another possible implementation of a method and a system in accordance with at least some other exemplary embodiments of the present disclosure. FIG. 2 illustrates a workshop 40 in which various actions may be performed on vehicles. For instance, it may be a regular service action, an action involving updating or installation of hardware and/or software, an action involving repairing or replacing one or more vehicle parts, etc. Thus, in such exemplary embodiments, said predetermined location will be in the workshop 40, and the identified recommendation data may comprise a recommended action to be performed on the vehicles visiting the workshop 40. The database containing the association between the recommendation data and the vehicle chassis numbers may suitably be a local database of the workshop 40. However, it is also conceivable to use a remote database, such as a remote database of a vehicle manufacturer, a fleet owner, etc. Such a remote database may suitably be accessible from the workshop 40 by appropriate telematics communication. The control unit (not shown) may thus suitably, although not necessarily, be located in the workshop 40. As mentioned above, the identified recommendation data may comprise a recommended action to be performed. Such a recommended action may be to replace (or to perform service of) at least one part. In other words, the recommendation data may be a recommendation to provide, for instance, a service to the vehicle, and this in turn provides at least one part to be replaced.

As illustrated in FIG. 2, in order to anticipate the arrival of a vehicle 42 and to prepare for the recommended action for time-saving purposes, the off-board transceiver 24 may be located outside of the actual workshop 40. In FIG. 2 a gate 44 has been schematically indicated as being provided with the off-board transceiver 24. Thus, when the vehicle 42 arrives at the premises of the workshop 40, the vehicle chassis number can be acquired and the recommendation data can be presented to a user interface in the workshop 40 even before the vehicle 42 has entered the actual workshop 40. It should however, be understood, that in other exemplary embodiments, the off-board transceiver may of course be located inside the workshop 40.

For either one of the implementations discussed in relation to FIG. 1 and FIG. 2, there are various conceivable communication solutions that may be used. For instance, according to at least some exemplary embodiments, the on-board transceiver 28 in the vehicle may form part of, or be operatively connected to, a tachograph of the vehicle. In such case, the wireless request signal 26 from the off-board transceiver 24 may be transmitted by Dedicated Short Range Communication protocol (DSRC), and of course the wireless response signal 30 will also be transmitted by DSRC. In at least some other exemplary embodiments, the on-board transceiver 28 may form part of, or be operatively connected to, a wireless communication module. The wireless communication module may be configured for telematics communication, such as via 3G, 4G or 5G and/or be configured for wireless local area network communication, such as WiFi. In such case, the wireless request signal 26 from the off-board transceiver 24 and the wireless response signal 30 from the on-board transceiver 28 may be transmitted via telematics network and/or wireless local area network, respectively.

Figure 3:
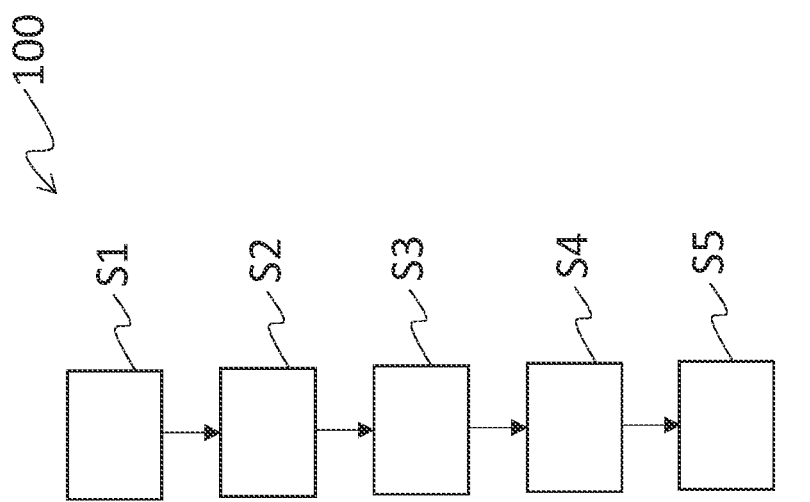
FIG. 3 is a schematic illustration of a computer-implemented method according to at least one exemplary embodiment of the present disclosure.

FIG. 3 is a schematic illustration of a computer-implemented method 100 according to at least one exemplary embodiment of the present disclosure. The computer-implemented method 100 may be implemented in connection with either one of the examples illustrated in FIGS. 1 and 2, and also in connection with any other examples encompassed by the teachings of the present disclosure. The computer-implemented method 100 is a computer-implemented method 100 of providing recommendation data associated to a vehicle before, when or after it arrives at a predetermined location, said predetermined location being on an assembly line or in a workshop, the method 100 comprising:

in a step S1, sending a wireless request signal from an off-board transceiver towards the vehicle, in a step S2, receiving, by the off-board transceiver, a wireless response signal from an on-board transceiver of the vehicle, the wireless response signal being triggered by the wireless request signal and containing an identification of the vehicle chassis number of the vehicle, in a step S3, accessing, by means of a control unit, a database in which different vehicle chassis numbers are associated with respective recommendation data, in a step S4, identifying, by means of the control unit, recommendation data associated with the identified vehicle chassis number in said database, and in a step S5, presenting, by means of the control unit, the identified recommendation data via a user interface.

Figure 4:
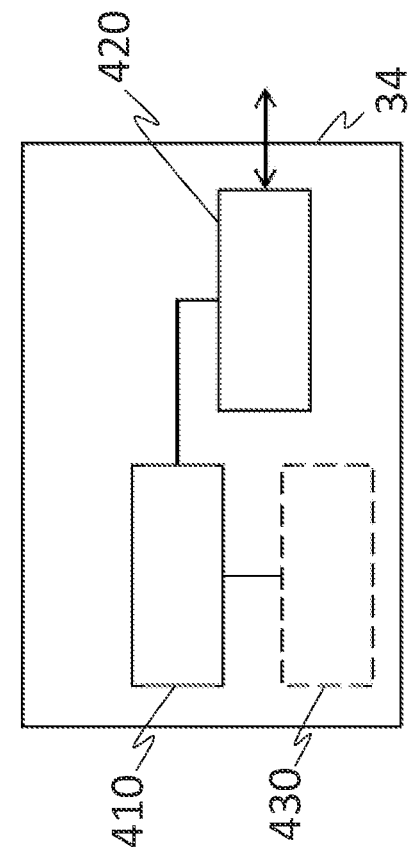
FIG. 4 schematically illustrates a control unit according to at least one exemplary embodiment of the present disclosure.

FIG. 4 schematically illustrates a control unit 34 according to at least one exemplary embodiment of the present disclosure. In particular, FIG. 4 illustrates, in terms of a number of functional units, the components of a control unit 34 according to exemplary embodiments of the discussions herein. The control unit 34 may be comprised in any system disclosed herein, such as the one illustrated in FIG. 1 and as discussed in connection with FIG. 2, and others discussed above. Processing circuitry 410 may be provided using any combination of one or more of a suitable central processing unit CPU, multiprocessor, microcontroller, digital signal processor DSP, etc., capable of executing software instructions stored in a computer program product, e.g. in the form of a storage medium 430. The processing circuitry 410 may further be provided as at least one application specific integrated circuit ASIC, or field programmable gate array FPGA.

Particularly, the processing circuitry 410 is configured to cause the control unit 34 to perform a set of operations, or steps, such as the method discussed in connection to FIG. 3 and exemplary embodiments thereof discussed throughout this disclosure. For example, the storage medium 430 may store the set of operations, and the processing circuitry 410 may be configured to retrieve the set of operations from the storage medium 430 to cause the control unit 34 to perform the set of operations. The set of operations may be provided as a set of executable instructions. Thus, the processing circuitry 410 is thereby arranged to execute exemplary methods as herein disclosed.

The storage medium 430 may also comprise persistent storage, which, for example may be any single one or combination of magnetic memory, optical memory, solid state memory or even remotely mounted memory.

The control unit 34 may further comprise an interface 420 for communications with at least one external device such as an off-board transceiver 24, a database 32 and a user interface 36 as discussed herein. As such, the interface 420 may comprise one or more transmitters and receivers, comprising analogue and digital components and a suitable number of ports for wireline or wireless communication.

The processing circuitry 410 controls the general operation of the control unit 34, e.g. by sending data and control signals to the interface 420 and the storage medium 430, by receiving data and reports from the interface 420, and by retrieving data and instructions form the storage medium 430. Other components, as well as the related functionality, of the control unit 34 are omitted in order not to obscure the concepts presented herein.

Figure 5:
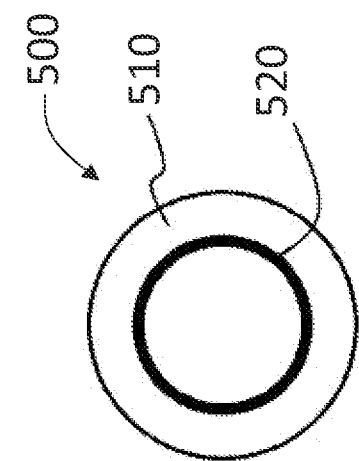
FIG. 5 schematically illustrates a computer program product according to at least one exemplary embodiment of the present disclosure.

FIG. 5 schematically illustrates a computer program product 500 according to at least one exemplary embodiment of the present disclosure. More specifically, FIG. 5 illustrates a computer readable medium 510 carrying a computer program comprising program code means 520 for performing the method exemplified in FIG. 3 and exemplary embodiments thereof, when said program product is run on a computer. The computer readable medium 510 and the program code means 520 may together form the computer program product 500.

The invention claimed is:

1. A computer-implemented method of providing recommendation data associated to a vehicle before, when or after it arrives at a predetermined location, said predetermined location being on an assembly line or in a workshop, the method comprising:

sending a wireless request signal from an off-board transceiver towards the vehicle, receiving, by the off-board transceiver, a wireless response signal from an on-board transceiver of the vehicle, the wireless response signal being triggered by the wireless request signal and containing an identification of the vehicle chassis number of the vehicle, accessing, by means of a control unit, a database in which different vehicle chassis numbers are associated with respective recommendation data, identifying, by means of the control unit, recommendation data associated with the identified vehicle chassis number in said database, and presenting, by means of the control unit, the identified recommendation data via a user interface.

2. The method according to claim 1, wherein said identified recommendation data comprises at least one vehicle part which is recommended for mounting on the vehicle.

3. The method according to claim 2, wherein said database comprises records of different types of said vehicle part, wherein said identified recommendation data associated with the identified vehicle chassis number comprises one of said different types of said vehicle part.

4. The method according to claim 1, wherein said predetermined location is a tire mounting station along an assembly line, wherein said identified recommendation data comprises the identification of a type of tire to be mounted when the vehicle has arrived at the tire mounting station.

5. The method according to claim 1, wherein said predetermined location is in a workshop, wherein said identified recommendation data comprises a recommended action to be performed on the vehicle.

6. The method according to claim 1, wherein said on-board transceiver forms part of, or is operatively connected to, a tachograph, wherein said request signal and said response signal are transmitted by Dedicated Short Range Communication (DSRC).

7. The method according to claim 1, wherein said on-board transceiver forms part of, or is operatively connected to, a wireless communication module, wherein the wireless communications module is configured for telematics communication, wherein said request signal and said response signal are transmitted via telematics network and/or wireless local area network, respectively.

8. A computer program comprising program code for performing the steps of the method according to claim 1 when said program code is run on a computer.

9. A computer readable medium carrying a computer program comprising program code for performing the steps of the method according to claim 1 when said program code is run on a computer.

10. A control unit for controlling the provision of recommendation data associated to a vehicle before, when or after the vehicle arrives at a predetermined location, said predetermined location being on an assembly line or in a workshop, the control unit being configured to perform the steps of the method according to claim 1.

11. A system configured to provide recommendation data associated to a vehicle before, when or after it arrives at a predetermined location, said predetermined location being on an assembly line or in a workshop, the system comprises:
an off-board transceiver configured to send a wireless request signal towards the vehicle and to receive a wireless response signal from an on-board transceiver of the vehicle, the wireless response signal being triggered by the wireless request signal and containing an identification about the vehicle chassis number of the vehicle,
a database in which different vehicle chassis numbers are associated with respective recommendation data,
a control unit, which comprises said off-board transceiver or which is operatively connected to said off-board transceiver, wherein the control unit is configured to access the database and, based on the wireless response signal, identify in the database recommendation data associated with the identified vehicle chassis number of the vehicle, and
a user interface operatively connected to, or comprised in, the control unit, wherein the control unit is configured to present the identified recommendation data via the user interface.

12. The system according to claim 11, wherein said identified recommendation data comprises at least one vehicle part which is recommended for mounting on the vehicle.

13. The system according to claim 12, wherein said database comprises records of different types of said vehicle part, wherein said identified recommendation data associated with the identified vehicle chassis number comprises one of said different types of said vehicle part.

14. The system according to claim 11, wherein said predetermined location is a tire mounting station along an assembly line, wherein said identified recommendation data comprises the identification of a type of tire to be mounted when the vehicle has arrived at the tire mounting station.

15. The system according to claim 11, wherein said predetermined location is in a workshop, wherein said identified recommendation data comprises a recommended action to be performed on the vehicle.

16. The system according to claim 11, wherein said on-board transceiver forms part of, or is operatively connected to, a tachograph, wherein said request signal and said response signal are transmitted by Dedicated Short Range Communication (DSRC).

17. The system according to claim 11, wherein said on-board transceiver forms part of, or is operatively connected to, a wireless communication module, wherein the wireless communications module is configured for telematics communication, wherein said request signal and said response signal are transmitted via telematics network and/or wireless local area network, respectively.

* * * * *